H. G. GEISSINGER.
VALVE CONTROLLER MECHANISM.
APPLICATION FILED FEB. 26, 1910.
989,543.
Patented Apr. 11, 1911.
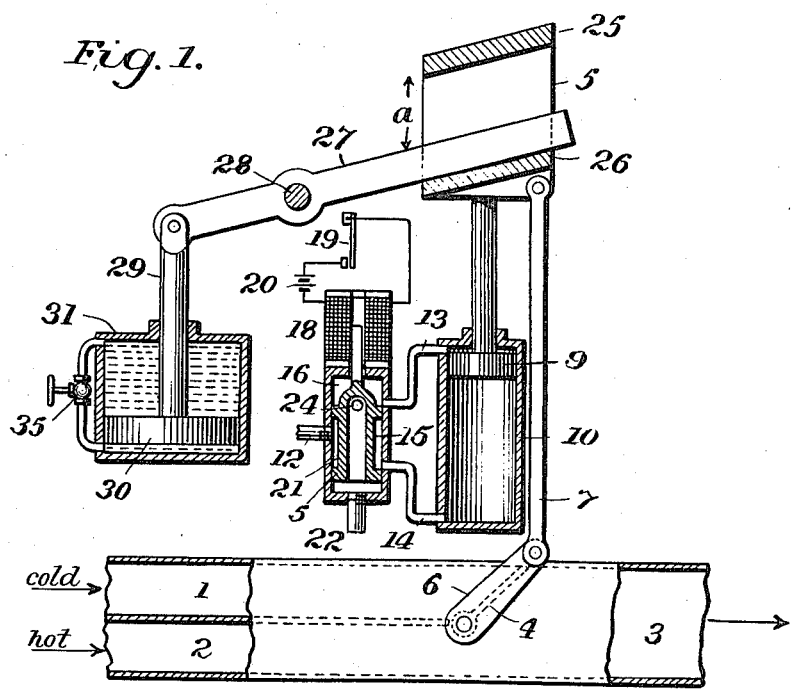
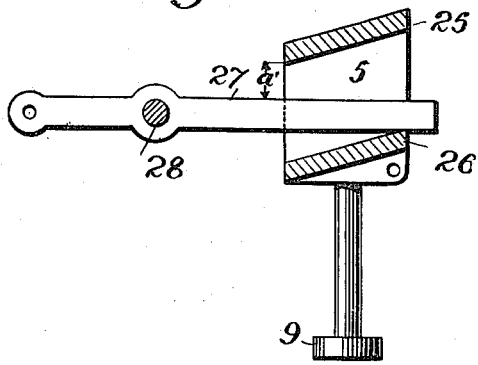
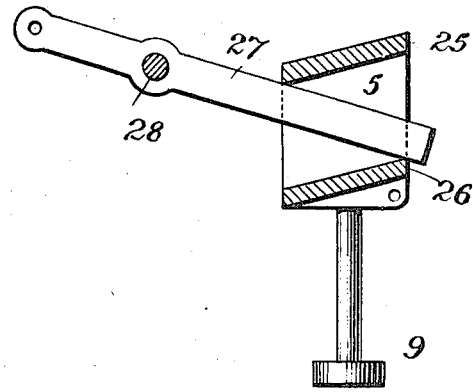
Witnesses
Inventor
H. G. Geissinger
By Eugene C. Brown
Attorney

UNITED STATES PATENT OFFICE.

HARRY G. GEISSINGER, OF NEW YORK, N. Y., ASSIGNOR TO GEISSINGER REGULATOR COMPANY, OF NEW YORK, N. Y., A CORPORATION OF NEW YORK.

VALVE-CONTROLLER MECHANISM.

989,543.  Specification of Letters Patent.  Patented Apr. 11, 1911.

Application filed February 26, 1910. Serial No. 546,247.

*To all whom it may concern:*

Be it known that I, HARRY G. GEISSINGER, a citizen of the United States, residing at New York, in the county of New York and State of New York, have invented new and useful Improvements in Valve-Controller Mechanism, of which the following is a specification.

My invention relates to valve controller mechanism operating to regulate the movements of valves and dampers under automatic control.

For the purpose of illustrating one embodiment of my invention, I will describe its application to the regulation of dampers operating to admit hot and cold air to a distributing box or duct in a heating system subjected to thermostatic control.

It is well known that every thermostat has a certain lag in its sensitiveness and does not respond instantly to a changed condition in the surrounding temperature. This lag usually causes a difference of from one to two degrees to intervene between the condition of a surplus of heat and a deficit of heat. Now it requires the lapse of a certain interval of time to raise the temperature of a room two degrees by a surplus supply of heat and a corresponding amount of time to lose this heat under a lessened supply. It is probable that twenty minutes would be a fair average of time consumed in making this change in the range of temperature. During this interval, the damper is opening or closing under the influence of the thermostat, and if the motion is too rapid, there will be delivered alternately into the air-pipe or conduit blasts of cold and hot air caused by the "hunting" or fluctuation of the damper. On the other hand, if the motion of the damper is too slow, a long time is required to find the mean position on starting from a cold room.

It has been found that there is a general defect in the motion of the damper during the time of "lag" of the thermostat which is productive of different percentage effects, depending upon the position of the damper. Thus, if the damper has been in a position to entirely close off the hot air, a movement of one quarter of the throw of the damper, mixing hot air of probably 180° with cool air of perhaps 60°, would produce a very noticeable difference in the temperature of the air supplied through the common duct. Again, in the control of dampers in the flues of coal fires, the liability of closing the damper suddenly or completely when a reduction of heat was desired, would often be even dangerous. In the control of steam applied to heating coils, the heat inertia of the mass of metal in the heater, combined with the "lag" of the thermostat in a different room, inevitably causes the heater to deliver alternate blasts of hot and cold air.

My invention aims to counteract the ill effects due to the "lag" of the thermostat and prevent the "hunting" of the dampers and the alternate delivery of hot and cold blasts, by giving a compound motion to the valve or damper actuating mechanism and controlling the speed of the slow component of the motion; and also by changing the ratio of the rapid and slow components of motion in accordance with the different positions of the valve or damper.

This invention will be more clearly understood from the following description in connection with the accompanying drawings, in which—

Figure 1 illustrates a valve or damper operating mechanism embodying my invention; and Figs. 2 and 3 show different positions of the device for determining the ratio between the rapid and slow components or elements of the compound valve movement.

My invention may be applied to the control of the valve or damper which regulates the proportions of hot and cold air entering the common duct or heat distributing pipe leading to the rooms of a building. Thus, in Fig. 1, the channels 1 and 2 conduct the cold and hot air into the common supply duct 3 in proportions depending upon the position of the damper 4, which is connected to the head 5 of the power mechanism through the lever 6 and link 7. The piston 9 may be operated within the cylinder 10 by compressed air, steam or other fluid from the supply pipe 12, and entering the ports 13, 14, alternately under the control of the valve 15 in the valve chest 16. I have shown the valve 15 arranged to be actuated by a solenoid 18, under the control of a thermostat 19, in the circuit of a battery 20 and which may be located in a distant room in which the temperature is to be regulated.

The operation of the valve controlling mechanism will be clearly understood from the drawing. In the position shown, the port 14 is connected with the source of fluid pressure through the groove 21 of the valve, and the port 13 with the exhaust 22 through the opening 24. When the solenoid is energized by the closing of the thermostat contacts, the valve 15 will be lifted thereby connecting the port 13 with the source of fluid pressure through the valve groove 21 and connecting the port 14 with the exhaust 22 and causing the piston to descend.

It will be readily seen that the piston may descend rapidly until the valve has been moved to about mid-position, when the upper lug 25 of the head strikes the arm 27 pivoted at 28 and connected with the stem 29 of the dash-pot piston 30. From this point the remainder of motion of the piston 9 is regulated in speed by the action of the liquid in the dash-pot and may be made to travel very slowly indeed. The liquid in the dash-pot 31 can pass from one side of the piston to the other by flowing through the contracted passage in the by-pass tube 33, the size of the orifice being controlled by an adjustable valve 35. The adjustment of this valve is made to suit the special conditions of any particular installation, and, as previously explained, can be regulated to cause a very slow movement of the valve. The effect of this compound movement of the piston 9 is to cause a rapid movement of the valve 4 during the first portion of its travel, say one-half of the throw of the valve, or the distance $a$, when the influx of cold air into the full stream of hot air will not cause too great a change in the degree of temperature, while the remainder of the valve travel is very slow, since a sudden movement increasing rapidly the influx of cold air and a corresponding diminution of the hot air would produce too violent changes in the resultant temperature. The valve or damper is thus very slowly brought to its proper position to cause the desired mixture of hot and cold air and the gradual change of temperature.

The above range of rapid movement of the piston and valve motion is suitable when the valve starts from the position shown in Fig. 1, with the cold air entirely cut off and the hot air fully on. If, however, the valve is in mid-position when the thermostat causes a change of position, the first portion or rapid component of the throw must be shorter than it was when the valve was in extreme upper position, since any movement of the valve downward when in mid-position will have a greater effect by reason of the fact that it is now cutting off the supply of hot air with every change of position. By examining Fig. 2, it will be evident that my invention automatically provides for the necessary change in the range of rapid movement, because the distance $a'$ now between the lever 27 and the lug 25 is only one-half as great as the distance $a$, when the parts were in the extreme upper position shown in Fig. 1. The dash-pot regulation, therefore, comes into action after a short portion of the movement of the piston.

When the damper is closed, shutting off the hot air entirely, the arm 27 of the dash-pot will be inclined downwardly and engage both lugs 25 and 26 of the piston-head 5, as shown in Fig. 3. When the parts are in this position, a change in temperature acting upon the thermostat to cause an upward movement of the piston cannot result in any rapid movement of the damper because any movement of the piston is under the control of the dash-pot and must necessarily be slow, thus preventing any sudden inrush of hot air which would precipitate a rapid change in the resultant temperature. The movement of the damper when it is near its lower limit is gradual because the parts are in the position shown in Fig. 3, and are under the control of the dash-pot for movement in either direction, but when the damper is in the upper range of movement the first portion of the throw will always be rapid.

The proportion of the throw of the damper which shall be rapid is fixed by the construction of the head and the inclination of the lugs 25, 26, and may be made any desired value. Different positions of the arm 27 corresponding to different positions of the damper, permit of rapid motion over the same proportion of the remaining arc of travel and thus automatically produce the motion necessary for perfect regulation of temperature where the compartment is located at a distance from the heater, or the heater or the fire possesses great inertia or tendency to persist. Likewise the restraint of the dash-pot is regulated by the size of the passage in the by-pass tube and may be adjusted by the valve 35 to cause any desired graduated speed, providing the time element necessary to compensate for the "lag" in the thermostatic element and overcoming the "hunting" of the damper, a defect frequently found in temperature regulating systems.

While I have described rather minutely an embodiment of my invention applied to the regulating damper in a system of heat control, it will be evident to engineers and other skilled persons that it is applicable not only to the control of valves for the control of cooling or systems of refrigeration, but also in many other relations wherein a compound motion is desired in the operation of a reciprocating valve or other part. Again, it is to be understood that I have shown the pilot valve actuated by means of a solenoid, merely for purposes of illustration, and that I am not restricted thereto, since it is evident that I may employ other means to actuate the same.

I am also aware that other changes may be made in the structures embodying my invention without departing in any manner from the spirit thereof, and I intend to cover any such modifications, since

I claim:—

1. Valve controlling mechanism, comprising a valve, means for operating said valve having constant driving connection therewith, means for permitting unrestrained motion of said operating means during a portion of its travel and for mechanically retarding its motion during another portion of its travel, and means for varying the extent of said unrestrained motion.

2. Valve controlling mechanism comprising a valve, means for operating said valve, a thermostatically controlled device for determining the direction and amount of travel of said operating means, and means for permitting unrestrained motion of said operating means during a portion of its travel and for mechanically retarding its motion during another portion of its travel.

3. Valve controlling mechanism comprising a valve, means for operating said valve through a certain range of motion, means for varying the amount of travel of said operating means, and means for permitting unrestrained motion of said operating means during a portion of its travel and for mechanically retarding its motion during another portion of its travel.

4. Valve controlling mechanism comprising a valve, means for operating said valve through a certain range of motion, means for varying the amount of travel of said operating means, and means for permitting unrestrained motion of said operating means during a portion of its travel and for mechanically retarding its motion during another portion of its travel, the relation of the unrestrained portion to the remainder of the range of motion being substantially constant.

5. Controlling mechanism for reciprocating or oscillating valves, comprising a valve, operating mechanism having constant driving connection therewith, means for permitting free movement of the operating parts during a portion of the range of movement and for mechanically retarding the same during another portion of the movement, the amount of said free movement depending upon the relative position of the parts.

6. Controlling mechanism for reciprocating or oscillating valves having constant driving connection with the operating means, comprising means for permitting free movement of the operating parts during a portion of the range of movement and for mechanically retarding the same during another portion of the movement, the amount of said free movement depending upon the relative position of the parts, and means for regulating the amount of retardation.

7. Controlling mechanism for reciprocating or oscillating valves, comprising operating mechanism therefor provided with a head having parallel spaced lugs inclined with respect to the direction of movement, a retarding device having an arm intermediate said lugs and adapted to engage one or the other lug depending upon the direction of movement, and means for regulating the action of said retarding device.

8. Controlling mechanism for reciprocating or oscillating valves, comprising operating mechanism therefor provided with a head having spaced lugs, a retarding device intermediate said lugs and adapted to engage one or the other lug during a portion of the travel of the head in either direction, depending upon the direction of movement, and means for regulating the action of said retarding device.

9. Controlling mechanism for reciprocating or oscillating valves, comprising operating mechanism therefor provided with a head having lugs spaced apart and inclined with respect to the direction of movement, a dashpot having a lever arm projecting between said lugs and adapted to engage one or the other lug depending upon the direction of movement.

In testimony whereof I have hereunto set my hand in presence of two subscribing witnesses.

HARRY G. GEISSINGER.

Witnesses:
LAURA E. SMITH,
J. H. GOLDSTEIN.